May 13, 1930.　　　　D. T. EVANS　　　　1,758,280

ROLLER FOR TRAVELING CONVEYERS

Filed May 17, 1929

Inventor.
David T. Evans.

Patented May 13, 1930

1,758,280

UNITED STATES PATENT OFFICE

DAVID T. EVANS, OF TORONTO, ONTARIO, CANADA

ROLLER FOR TRAVELING CONVEYERS

Application filed May 17, 1929. Serial No. 363,956.

The objects of this invention are to provide a roller for traveling conveyers which will materially reduce the labour and expense of replacement of broken or seized rollers and will reduce to the minimum the time consumed in re-mounting rollers requiring replacement and particularly the rollers used in bake oven conveyers where they are subject to very high temperature and where replacement has to be undertaken with the conveyer in operation.

A further and very important object is to devise a construction of roller which will obviate the necessity of replacement of a conveyer section on account of the breaking or seizing of the rollers.

In the drawings, Figure 1 is a perspective view of my improved roller.

Figure 1:
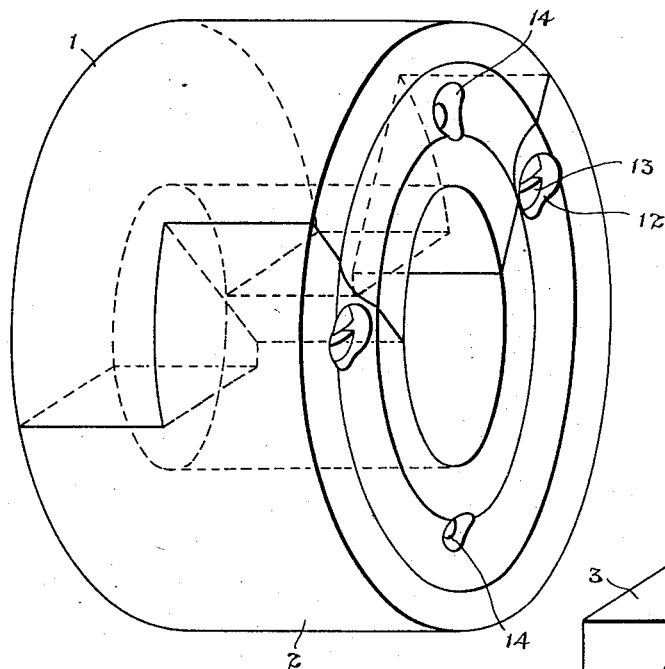
Figure 2:
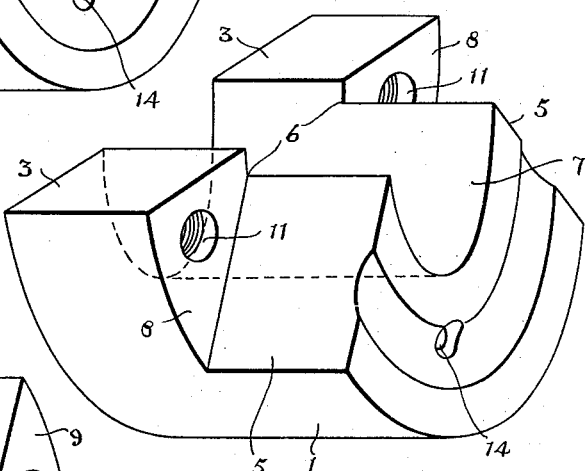
Figure 2 is a perspective view of one of the roller sections separated from the other.
Figure 3:
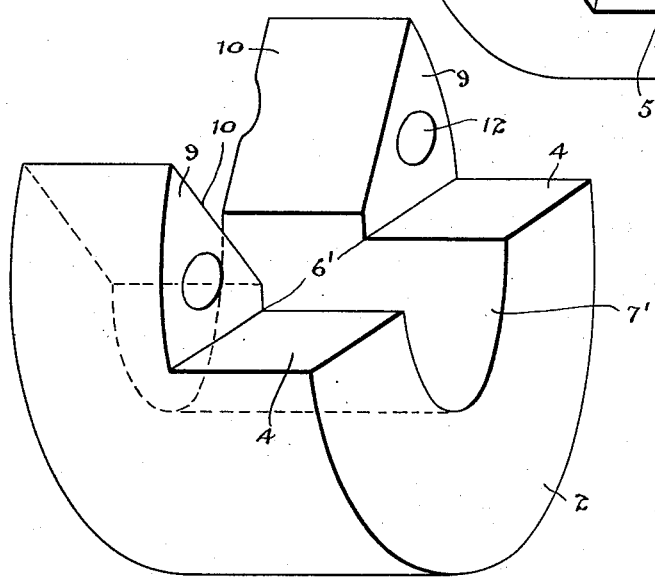
Figure 3 is a perspective view of the removed section in a reversed position from that shown in Figure 2.

It has been the custom in the manufacture of traveling conveyers of the chain type to mount the rollers on the section in such a manner that when rollers became broken or seized it was necessary to remove the entire section. Such a condition necessitates a very considerable loss of time in the use of the apparatus and particularly so in bake oven structures where the conveyer is heated to a temperature which prohibits handling until the oven is shut down and the belt allowed to cool.

The present invention has been devised to overcome these difficulties and it consists of two part cylindrical members 1 and 2. Each of the members is formed with a portion of the length semi-cylindrical and the flat diametral surfaces 3 of the section 1 are adapted to coincide with the flat diametral surfaces 4 of the section 2.

The remaining length of the section 1 is formed with the bevelled surfaces 5 extending in an acute angular direction from the point 6 of the bore 7 which are slightly offset from the flat surfaces 3 to the outer perimeter, thus forming the substantially triangular faces 8 at right angles to both the faces 3.

The section 2 of the roller extending beyond the flat diametral surfaces 4 is formed with the right angularly arranged faces 9 adapted to abut the faces 8 of the section 1 when they are placed together and the inwardly bevelled faces 10 of this extension portion are adapted to coincide with the bevelled faces 5 of the member 1, the inner edges of the bevelled faces 10 being offset slightly from the point 6' where the faces 4 intersect the bore 7' of the pulley section.

It will be seen that the two sections of the pulleys thus described will fit snugly together to form a complete cylinder with the faces 8 and 9 abutting and the bevelled faces 5 engaging the bevelled faces 10 definitely align the two sections and hold them in alignment in operation without stress upon any holding means for securing the two parts together.

The segments of the member 1 between the faces 3 and 5 are formed with the parallel threaded holes 11 and holes 12 are bored in the segments of the member 2 between the faces 4 and 10 to receive the fillister head screws 13. These screws when placed in position and drawn tight draw the faces 8 and 9 snugly into contact.

Oil holes 14 are bored angularly through the roller sections 1 and 2 to convey oil to the bore 7'.

It will be seen that by simply removing the screws 13 the two roller sections may be lifted radially away from the shaft on which they are mounted and in replacing, the one section may be dropped on to the other and will align itself and it is merely necessay to secure the members together by means of the screws which will be provided with suitable lock washers.

Such a roller is particularly adaptable for bake ovens as access to a broken roller may be had through the side doors of the oven and it will be merely necessary to remove the screws which can easily be accomplished with a long-handled screw driver and the two parts may then be lifted out without fouling the rest of the conveyer.

A new roller may be placed in position through the side doors of the oven if necessary, but the conveyer may be moved along to the end of the oven without the roller where the new one may be placed in position more conveniently.

The peculiar shape of the roller by the offset of the bevelled sections maintains a solid support for the member carried thereby at all times. Further, such construction allows the roller to expand and contract freely without seizing upon the shaft on which it is carried, as the expansion is taken up in the sections separately.

The construction of the roller is extremely simple but very efficient and it is economical to manufacture.

What I claim as my invention is:—

1. A roller for traveling conveyers formed of two separable members adapted to be separated radially and having co-mating bevelled surfaces adapted to direct the members to a centred position and means independent of said bevelled surfaces for securing said members together against radial displacement.

2. A roller for traveling conveyers, comprising a pair of part cylindrical members each divided diametrically for a portion of its length and one having portions cut away from the diametral portion with faces arranged extending outwardly from the bore at equal acute angles, the other member having offset portions bevelled toward the bore at equal opposite angles to accurately fit the bevelled portions of the other member.

3. A roller bearing for traveling conveyers, comprising a pair of part cylindrical members each having diametral faces extending for a portion of their length and adapted to abut and having faces arranged at right angular relation to the diametral faces and faces extending beyond the latter faces and bevelled to extend at an acute angle from the bore of the roller to effect the centering of both members, holes parallelly arranged in the opposing offset portions, and screws extending through said holes and securing the members together.

4. A roller for traveling conveyers formed of two separable members adapted to be separated radially and having co-mating bevelled surfaces adapted to direct the members to a centred position, and detachable means engaging each of said separable members and securing the same together against radial separation.

5. A roller for traveling conveyers formed of two separable members adapted to be separated radially and having co-mating bevelled surfaces adapted to direct the members to a centered position, and threaded means for securing said separable members against rarial separation.

6. A roller for traveling conveyers formed of two separable members adapted to be separated radially and having co-mating bevelled surfaces adapted to direct the members to a centered position, said separable members having shoulder portions adapted to engage each other to effect their relative positioning in an axial direction, and threaded means entering said shoulder portions and clamping the members together.

7. A roller for traveling conveyers formed of two separable members adapted to be separated radially and having co-mating bevelled surfaces adapted to direct the members to a centered position, said separable members having shoulder portions adapted to engage each other to effect their relative positioning in an axial direction, and locking screws extending through the shoulder portions of one of said members parallel with the roller axis and threaded into the opposing shoulder portion of the other member and securing said members against relative axial or radial displacement.

DAVID T. EVANS.